Patented Dec. 17, 1940

2,225,603

UNITED STATES PATENT OFFICE 2,225,603

DYE STAIN

Herbert A. Lubs, Wilmington, Del., assignor to E. I. du Pont de Nemours & Company, Wilmington, Del., a corporation of Delaware No Drawing. Application October 20, 1939, Serial No. 300,418

20 Claims. (Cl. 8—3)

This invention relates to dye stains and more particularly to dye stains for coloring wood. Wood may be stained with water solutions of dyes but such solutions have the undesirable property of tending to raise the grain of the wood. It is now customary to stain wood with solutions of dyes in organic solvents, particularly alcohol. This type does not raise the grain of the wood but it is difficult and sometimes impossible to dissolve sufficient dye in the solvent to produce heavy shades. Dyes which are sufficiently soluble frequently have poor light fastness. Even when dyes of sufficient solubility in the solvent to produce heavy shades on the wood are found, there is a tendency for the stained wood to exhibit a bronzy appearance which is most undesirable.

Berliner in Patent 2,137,830 has disclosed woodstains containing formamide and methanol. No mention is made of substituted formamides which are much superior, in solvent power for dyes, than formamide itself.

It is an object of the present invention to provide dye stains which are more effective for coloring wood. Another object is to provide wood stains which comprise solutions of dyes. A further object is to provide dye stains comprising solutions of dyes which are valuable for coloring wood in brighter, heavier and less bronzy shades. A still further object is to provide a new and improved method of coloring wood. Other objects are to provide new compositions of matter and to advance the art. Still other objects will appear hereinafter.

The above and other objects may be accomplished in accordance with my invention which comprises dissolving dyes and dye stains, preferably of the non-aqueous, non-grain raising types such as the spirit and oil stains, in normally liquid N-aliphatic substituted aliphatic acid amides free of acidic and basic substituents. I have discovered that such amides are excellent solvents for dyes of the water, spirit and oil soluble types and that the resulting solutions are highly penetrative and are excellent coloring compositions for coloring wood. The coloring compositions have superior tinctorial properties and have unusually high color strength and covering properties.

The solvents to be employed in accordance with my invention are the normally liquid N-aliphatic substituted aliphatic acid amides in which the aliphatic radicles are, preferably, hydrocarbon radicles, that is, consist of carbon and hydrogen, but may contain substituents such as halogen, hydroxy and alkoxy groups. These solvents may be designated by the formula

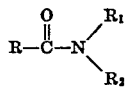

wherein R represents hydrogen or an aliphatic radicle, $R_1$ represents hydrogen or an aliphatic radical, and $R_2$ represents an aliphatic radicle. Preferably, R represents hydrogen and $R_1$ and $R_2$ represent alkyl radicles, and preferably the lower alkyl radicles of 1 to 6 carbon atoms. In other words, my preferred compounds are the normally liquid unsubstituted N-alkyl alkyl-acid amides, and particularly the N-dialkyl formamides. However, within the broad aspects of my invention, I intend to include the N-mono and di-aliphatic substituted formamides in which the aliphatic groups contain up to 12 carbon atoms, the N-mono and di-aliphatic substituted acetamides where the aliphatic radicles contain up to 6 carbon atoms and other N-mono and di-aliphatic substituted acid amides which are normally liquid; that is, which are liquid at ordinary room temperatures. By the term "aliphatic," in the absence of other limitation, I intend to include saturated and unsaturated radicles which may contain, as substituents, halogen, hydroxy and alkoxy radicles, but to exclude radicles containing benzene and other aromatic rings, i. e., my compounds are strictly aliphatic and contain no aromatic rings. By the term "aliphatic hydrocarbon," I intend to include saturated hydrocarbon radicles and unsaturated hydrocarbon radicles, but to exclude radicles containing benzene or other aromatic rings and non-hydrocarbon substituents. By the term "alkyl," I intend to include only the unsubstituted saturated aliphatic hydrocarbon radicles.

Amongst the solvents which I have found to be effective and particularly satisfactory for my purpose are:

N-dimethyl formamide

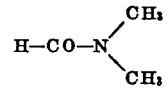

N-monomethyl formamide

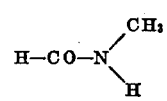

N-monoisobutyl formamide

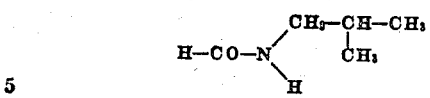

N-dimethyl acetamide

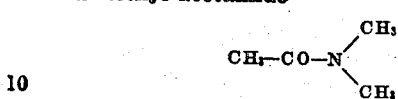

N-dimethyl butyramide

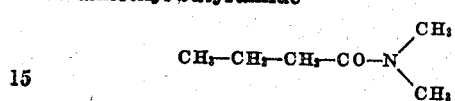

N-dimethyl valeramide

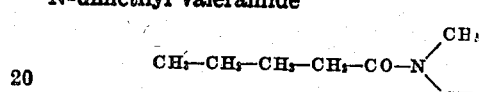

N-dimethyl heptoamide

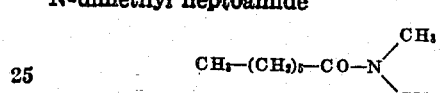

N-dimethyl caprylamide

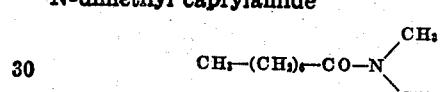

N-monocyclohexyl formamide

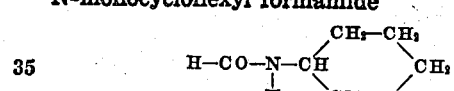

N-dimethyl methoxy acetamide

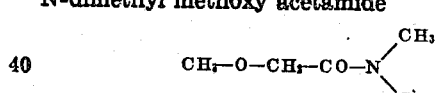

N-mono-hydroxymethyl acetamide

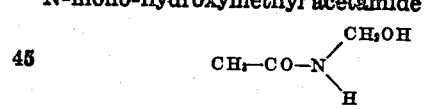

N-mono-hydroxymethyl formamide

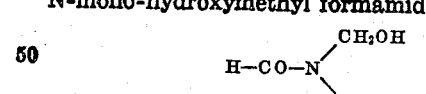

N-mono-b-chlorethyl formamide

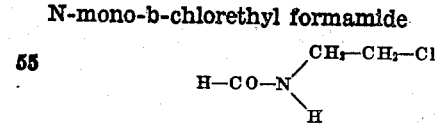

My solvents may be employed as the sole solvent for the dye but, preferably, they will be diluted with alcohol, oil or other solvents. Also the dye stains may contain binders such as shellac, rosin, ethyl cellulose, cellulose acetate, glue, size, casein and other natural and synthetic gums and resins, and the like. The proportions of ingredients and their nature may be very greatly varied as desired in accordance with the method of coloring and the results desired.

In order to illustrate my invention more clearly, the preferred modes of carrying the same into effect and the advantageous results to be obtained, the following examples are given in which the parts are by weight:

*Example 1*

5 parts of the diorthotolyl guanidine salt of "Pontamine" Fast Red 8BL (Color Index #278), which is an alcohol soluble dye, were dissolved in 5 parts of N-dimethyl formamide and the resulting solution diluted with 36 parts of denatured alcohol. A clear solution was obtained, even without the application of heat. When applied to wood or wood products, a bright red shade is produced which is much less bronzy than that produced from an alcohol solution of the dye alone. In addition, the dye must be heated with alcohol to complete solution in the absence of the amide. On cooling, the dye tends to precipitate while such is not the case if N-dimethyl formamide is present.

*Example 2*

A mixture of equal parts of Methyl Violet (Color Index #680) and tannic acid was substituted for the dye in Example #1. A woodstain of the same excellent properties was obtained.

*Example 3*

Crocein Scarlet (Color Index #252) which is a water soluble dye of relatively poor alcohol solubility was substituted for the dye is Example #1. This amount of dye will not dissolve in this quantity of alcohol without the use of N-dimethyl formamide. Stains from the straight alcohol solution are much weaker than those from this example.

*Example 4*

5 parts of Oil Red (Color Index #258) were dissolved in 5 parts of N-dimethyl formamide and this solution diluted with 40 parts of benzene. This stain, when applied to wood, is much brighter and less bronzy than a solution of the same dye in benzene alone.

It will be understood that the above examples are given solely for illustrative purposes. Many other variations can be made in the ingredients employed and in the proportions. For instance, the di-ortho-tolyl guanidine salt of Crocein Scarlet (Color Index #252), when dissolved in an equal weight of N-dimethyl formamide, is miscible with alcohol in all proportions. Many other dyes of the classes of water, spirit and oil soluble dyes may be used. The usual assistants, binders and diluents may be added as desired. The proportions of solvent may be varied over the range generally employed in spirit and oil stains. Also, other amides may be employed such as:

N-mono-ethyl formamide
N-diethyl formamide
N-mono-propyl formamide
N-dipropyl formamide
N-mono-isopropyl formamide
N-diisopropyl formamide
N-diisobutyl formamide
N-mono-butyl formamide
N-dibutyl formamide
N-mono-amyl formamide
N-mono-isoamyl formamide
N-di-cyclohexyl formamide
N-mono-hexyl formamide
N-mono-heptyl formamide
N-mono- and di-ethyl acetamides
N-mono- and di-propyl acetamides
N-mono- and di-butyl acetamides
N-mono- and di-amyl acetamides
N-mono- and di-hexyl acetamides
N-mono- and di-cyclohexyl acetamides
N-di-methyl propionamide
N-di-ethyl propionamide
N-di-ethyl butyramide Due to the unusual solvent properties of my solvents, it is possible to prepare clear solutions of dyes which are only slightly soluble in water, oil, alcohol and other organic solvents. When employed with other solvents, they greatly assist the solution of the dye making it possible to obtain much more concentrated dye solutions and they will preferably be added to alcohol and oil stains to improve the coloring properties of the stains and to increase the solubility of the dyes in such stains. By the terms "spirit stains" and "oil stains," I mean the stains of the type usually so designated in the art and which comprise solutions of dyes in alcohols, aromatic hydrocarbons, oils and similar organic solvents. The compounds are essentially neutral and do not interfere with the other properties of the dyes or the properties of the other ingredients. With the use of my solvents, it is possible to stain wood in heavier shades than heretofore. Such shades are brighter and stronger and show greatly decreased bronzing tendencies. My solvents have no tendency to raise the grain of wood to which they are applied.

I claim:

1. A dye stain comprising a dye of the group consisting of water soluble dyes, alcohol soluble dyes and oil soluble dyes dissolved in a normally liquid N-alkyl substituted amide of a lower monocarboxylic aliphatic acid, free of acidic and basic substituents.

2. A dye stain comprising a dye of the group consisting of water soluble dyes, alcohol soluble dyes and oil soluble dyes dissolved in a normally liquid N-lower di-alkyl substituted amide of a lower mono-carboxylic aliphatic acid, free of acidic and basic substituents.

3. A dye stain comprising a dye of the group consisting of water soluble dyes, alcohol soluble dyes and oil soluble dyes dissolved in a normally liquid N-dimethyl substituted amide of a lower monocarboxylic aliphatic acid, free of acidic and basic substituents.

4. A dye stain comprising a dye of the group consisting of water soluble dyes, alcohol soluble dyes and oil soluble dyes dissolved in N-dimethyl formamide.

5. A staining composition comprising a dye stain of the group consisting of spirit stains and oil stains having incorporated therein a normally liquid N-lower alkyl substituted amide of a lower unsubstituted monocarboxylic aliphatic acid.

6. A staining composition comprising a dye stain of the group consisting of spirit stains and oil stains having incorporated therein a normally liquid N-lower alkyl substituted amide of a lower unsubstituted monocarboxylic saturated aliphatic acid.

7. A staining composition comprising a dye stain of the group consisting of spirit stains and oil stains having incorporated therein an N-lower alkyl substituted formamide.

8. A staining composition comprising a dye stain of the group consisting of spirit stains and oil stains having incorporated therein an N-lower dialkyl substituted formamide.

9. A staining composition comprising a dye stain of the group consisting of spirit stains and oil stains having incorporated therein N-dimethyl formamide.

10. The method of staining wood which comprises applying to the surface of the wood a dye stain comprising a dye of the group consisting of water soluble dyes, alcohol soluble dyes and oil soluble dyes dissolved in a normally liquid N-aliphatic substituted amide of a monocarboxylic aliphatic acid, free of acidic and basic substituents, and then evaporating off the amide.

11. The method of staining wood which comprises applying to the surface of the wood a dye stain comprising a dye of the group consisting of water soluble dyes, alcohol soluble dyes and oil soluble dyes dissolved in a normally liquid N-aliphatic substituted amide of a monocarboxylic aliphatic acid in which the aliphatic radicles are hydrocarbon radicles, and then evaporating off the amide.

12. The method of staining wood which comprises applying to the surface of the wood a dye stain comprising a dye of the group consisting of water soluble dyes, alcohol soluble dyes and oil soluble dyes dissolved in a normally liquid N-lower di-alkyl substituted amide of a lower unsubstituted monocarboxylic saturated aliphatic acid, and then evaporating off the amide.

13. The method of staining wood which comprises applying to the surface of the wood a dye stain comprising a dye of the group consisting of water soluble dyes, alcohol soluble dyes and oil soluble dyes dissolved in N-dimethyl formamide, and then evaporating off the amide.

14. The method of staining wood which comprises applying to the surface of the wood a dye stain of the group consisting of spirit stains and oil stains having incorporated therein a normally liquid N-alkyl substituted amide of an unsubstituted monocarboxylic aliphatic acid, and then evaporating off the amide.

15. The method of staining wood which comprises applying to the surface of the wood a dye stain of the group consisting of spirit stains and oil stains having incorporated therein a normally liquid N-lower alkyl substituted amide of a lower unsubstituted monocarboxylic saturated aliphatic acid, and then evaporating off the amide.

16. The method of staining wood which comprises applying to the surface of the wood a dye stain of the group consisting of spirit stains and oil stains having incorporated therein N-dimethyl formamide, and then evaporating off the amide.

17. A dye stain comprising a dye of the group consisting of water soluble dyes, alcohol soluble dyes and oil soluble dyes dissolved in N-diethyl formamide.

18. A dye stain comprising a dye of the group consisting of water soluble dyes, alcohol soluble dyes and oil soluble dyes dissolved in N-dimethyl acetamide.

19. A staining composition comprising a dye stain of the group consisting of spirit stains and oil stains having incorporated therein N-diethyl formamide.

20. A staining composition comprising a dye stain of the group consisting of spirit stains and oil stains having incorporated therein N-dimethyl acetamide.

HERBERT A. LUBS.